Figure 1:
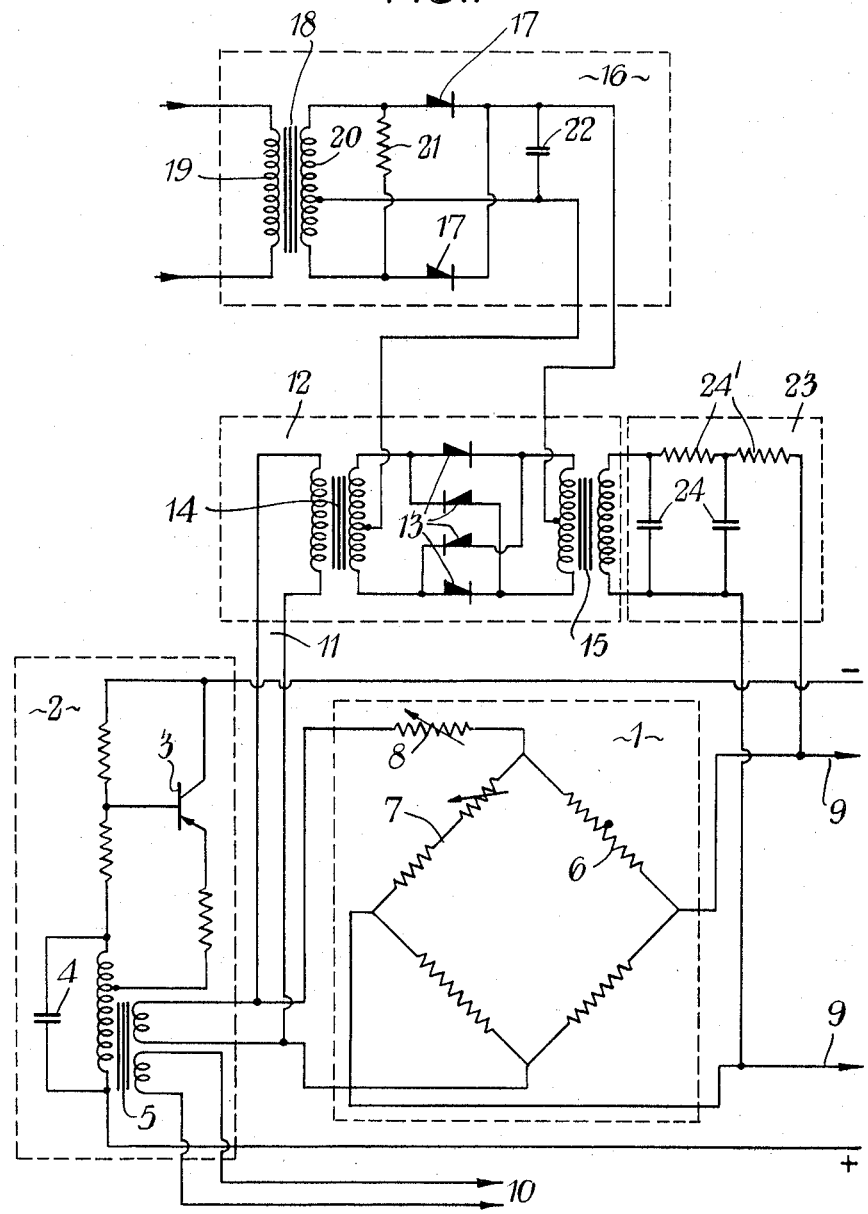

United States Patent Office 3,231,714
Patented Jan. 25, 1966

3,231,714
TEMPERATURE CONTROL FOR COMPARTMENTAL VEHICLES
Geoffrey Charles Oram, Dartford, Kent, and Stanley Mycroft, Crayford, Kent, England, assignors to J. Stone & Company (Deptford) Limited, London, England
Filed Dec. 17, 1962, Ser. No. 245,313
Claims priority, application Great Britain, Dec. 22, 1961, 46,030/61
7 Claims. (Cl. 219—202)

This invention concerns improvements relating to temperature control for a compartmental vehicle, especially a railway coach, in which heating in individual compartments or subdivisions of the vehicle is under the control of the occupants. An arrangement for such temperature control is described and claimed in the specification of United States Patent No. 3,028,471, and the present invention is, at least in some respects, concerned with improvements upon or modifications of the temperature-control arrangement claimed in that patent.

According to the said patent, an arrangement for controlling the temperature in compartments of a vehicle supplied with air from a common air-conditioning or heating equipment comprises in combination with a main thermostat controlling the said equipment and arranged to be influenced by the temperature of the air at a common return-air point, individual electric heaters for respective compartments, separately controllable switches for the said heaters, and means dependent upon the current supplied to the compartment heaters for automatically raising the effective setting of the main thermostat when individual compartment heating is switched on. With a main thermostat of the known heater-bias type, the bias applied could be caused to be varied in dependence upon the total current supplied for individual compartment heating.

In an arrangement in accordance with the present invention for controlling the temperature in compartments of a vehicle supplied with air from a common air-conditioning, heating and/or cooling equipment and provided with individually controllable heating and/or cooling means for respective compartments, heating and/or cooling means in the said equipment is controlled in dependence upon the total heating or cooling current, or the difference as between heating and cooling current, supplied to the said compartments by an arrangement for combining, with the output of a main temperature-sensing circuit, the output of a modulator in which an oscillatory or alternating voltage is modulated by a signal voltage proportional to the said total-compartment-heating or cooling current or current difference.

The main temperature-sensing circuit which, like the main thermostat of the aforesaid specification, serves to control the said air-conditioning, heating and/or cooling equipment in any appropriate known manner, for example through relays and contactor switches, may comprise a Wheatstone-bridge having a temperature-sensitive resistor in one arm. The bridge may be either an alternating-current or direct-current bridge. In the former case, it may be fed from an oscillator, which may also supply a reference voltage for the modulator. Alternatively, a thermocouple temperature-sensing circuit may be employed.

One suitable arrangement is illustrated by way of example in FIGURE 1 of the accompanying drawing. In this example, a Wheatstone-bridge 1 is fed from a transistor oscillator 2 of per se known type, including a transistor 3, capacitor 4 and transformer 5 whose primary winding forms the inductance of the tank circuit. The bridge includes a temperature-sending resistor 6 and a balancing or comparison resistor or resistors 7 which may serve for the setting of a desired control temperature. The resistor 6, which is exposed to the influence of the temperature of the air at a common return-point for air circulating between the vehicle and air-conditioning or heating equipment, may be of the type known as a thermistor, having a high negative coefficient of resistance. The bridge is fed from the oscillator through a resistor 8 which serves for sensitivity adjustment. The out-of-balance signal from the bridge 1 is supplied at 9 to relay and contactor or other control gear of the equipment.

The arrangement so far described is similar to that described and illustrated in the specification of United States patent application Serial No. 84,903, now abandoned. Use may further be made of a phase-detecting, step-discriminating, network such as is also described in that specification, in which case provision may again be made for a reference signal to be supplied to that network from the transformer 5, as indicated at 10.

The oscillator 2 also furnishes at 11 a reference voltage to a diode-bridge modulator 12 comprising rectifiers 13 and transformers 14, 15. A direct-current signal proportional to the total current supplied to heaters in the compartments of the vehicle, that is for so-called "reheat," is applied to centre tappings of corresponding windings of the transformers 14, 15. If, as will generally be the case, the current for the said heaters is alternating current, the signal may be obtained by means of a transformer-rectifier unit 16. This unit comprises rectifiers 17 and a current transformer 18 whose primary winding 19 carries the total "reheat" current and whose centre-tapped secondary winding 20, loaded by a resistor 21, is connected to the modulator through the rectifiers 17 and past a smoothing capacitor 22.

The output of the modulator 12, that is the oscillator voltage modulated by a signal voltage proportional to the total "reheat" current, is passed from the transformer 15 through a correcting network 23 comprising capacitance 24 and resistance 24'. This net-work is designed to compensate for the phase lag in the modulator input and output transformers 14, 15 and to render the final output signal from the modulator 12 more sinusoidal. As illustrated, the final signal is superimposed in parallel upon the signal from the Wheatstone-bridge 1, but it may be applied in series therewith.

If the current supplied to the "reheat" heaters is direct current, the unit 16 is dispensed with and the signal voltage supplied to the modulator 12 may be obtained by means of a diverter resistance in the heater-supply circuit.

The manner of operation of the above-described arrangement is as follows: As long as no "reheat" is being used in the compartments, the equipment is controlled to maintain a predetermined air temperature by the effect of the out-of-balance signal from the bridge 1. When "reheat" is switched on, however, the said signal is modified to an extent proportional to the total "reheat" current, so as to have the effect of raising the temperature setting of the temperature-sensing element 6. With increase in the direct-current signal supplied to the modulator 12, the alternating-current signal from the said modulator will increase up to nearly the full alternating-current input voltage from the oscillator 2, assuming that the transformers 14, 15 are wound 1:1. The increase is an approximately linear relation.

If the bridge 1 is operated with direct current, while the "reheat" heaters are supplied with alternating current, the modulator 12 is still employed. The primary winding of one of the transformers 14, 15 is connected to a source of alternating current providing a reference voltage, while that of the other transformer is supplied with an alternating current signal voltage proportional to the total "reheat" current. The centre taps of the secondary windings of the transformers 14, 15 are connected to the output of the bridge 1 and provide a signal, approximately linearly dependent on the total "reheat" current over a sufficient range, to be combined with the ouput signal of the bridge. The oscillator 2 is not required.

Figure 2:
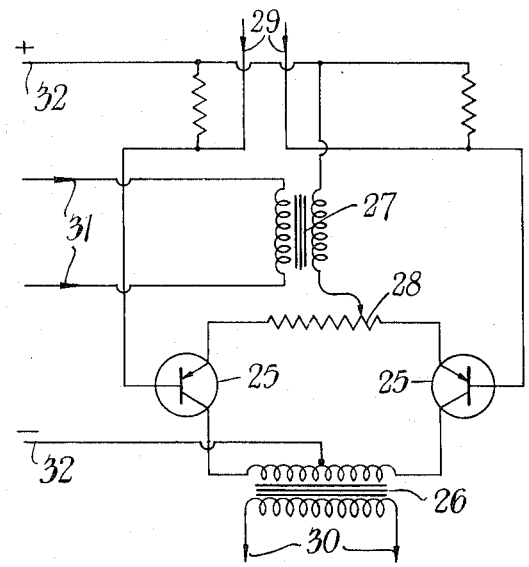

An alternative form of modulator circuit of per se known type comprising transistors 25, transformers 26, 27 and a potentiometer 28 is shown in FIGURE 2. A direct-current signal proportional to the total "reheat" current is supplied at 29 and the secondary winding of the tranformer 26 is connected at 30 to the output of a bridge similar to the bridge 1 of FIGURE 1. An alternating-current reference voltage is supplied from 31 to the primary winding of the transformer 27 whose secondary winding is connected to the balance point in the potentiometer 28. The modulator is connected at 32 to a source of supply.

If the polarity of the direct-current signal supplied to the modulator 12 in FIGURE 1 is changed, the phase of the alternating-current signal from the said modulator will change by 180°. Consequently, the output from a temperature-sensing circuit such as the bridge 1 can be modified in both directions.

Figure 3:
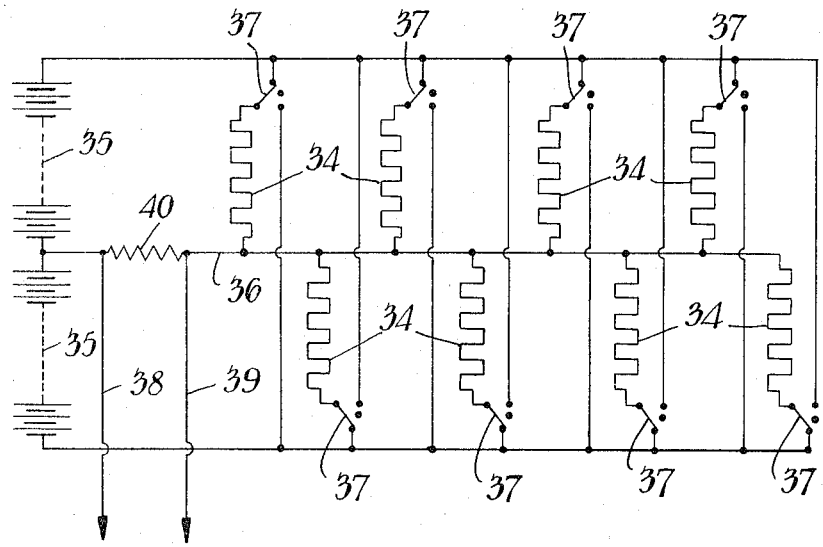

This property may be utilised in connection with compartment heating and cooling means in the form of Peltier units arranged to "pump" heat in or out between the vehicle compartments and the outside. FIGURE 3 illustrates an arrangement for the purpose set forth. Peltier units 34 for heating or cooling the compartments are supplied from batteries 35 by a 3-wire system of which 36 is the common return wire. Each unit or set of units 34 is controlled by a passenger operated switch 37 which can be set to two operative positions for energising the unit or set of units for heating and cooling respectively and to a third, off, position. By way of illustration, the upper units 34 are shown switched for cooling and the lower units 34 for heating their respective compartments. A direct-current signal to be supplied by wires 38 and 39 to a modulator such as has been described above is taken from across a resistor 40 in the return wire 36. That is to say, if a modulator of the kind shown in FIGURE 1, were used, the unit 16 of FIGURE 1 would be dispensed with and the wire 38 would be connected to the centre tap of one of the diode-bridge modulator transformers 14, 15 of FIGURE 1, while the wire 39 would be connected to the centre tap of the other transformer. If Peltier units 34 are switched on for heating only, the effect of the signal, which is proportional to the total current, in the modulator will be as described above. If, however, some units 34 are switched on for heating and some for cooling, then the current for one purpose will offset that for the other purpose to a greater or less extent and the voltage drop across the resistor 40 may be in the one or the other directoin, the wire 38 being the more positive if there is more heating than cooling and the wire 39 if there is more cooling than heating. The compensation which can be thus exercised upon the control by the main temperature-sensing circuit, for example by the bridge 1, will not be precise, but will afford an approximation adequate for practical purposes.

We claim:

1. In combination with a compartmental vehicle, air-treatment equipment provided on the said vehicle and common to the compartments thereof, means connecting said equipment to said compartments for supplying air thereto, temperature-influencing means in the said equipment, a main air temperature-sensing means for the said equipment, electrical temperature-influencing means for some of the individual-compartments, a circuit for supplying current to the said electrical temperature-influencing means, individual control means in the said compartments for said respective electrical temperature-influencing means, and a temperature-control arrangement which is connected with the said current and main temperature-sensing means and with the said temperature-influencing means in the said equipment and which comprises means producing a voltage signal proportional to the total said current supplied, a source of alternating voltage, a modulator to which the said alternating voltage and the said signal are supplied and in which the said alternating voltage is modulated by the said signal, the output side of the said modulator being connected with the said main temperature-sensing means so that the outputs therefrom are combined, and being connected to the said temperature-influencing means in the said equipment, whereby the last-named means is controlled in dependence upon the said total current as well as in dependence upon the said main temperature-sensing means.

2. An arrangement according to claim 1 and in which said temperature-sensing means is a temperature-sensing circuit, and an oscillator is connected to said circuit for feeding an alternating voltage thereto.

3. An arrangement according to claim 1 and in which said temperature-sensing means is a temperature-sensing circuit, and an oscillator is connected to said circuit and to the said modulator for feeding an alternating energizing voltage to the former and an alternating reference voltage to the latter.

4. An arrangement according to claim 1, wherein the modulator is a diode-bridge modulator.

5. An arrangement according to claim 1, wherein said current supplied to said electrical temperature-influencing means for individual compartments in alternation current, and said means producing a voltage signal proportional to the total said current supplied comprises a transformer-rectifier unit through which said signal is supplied to said modulator.

6. An arrangement according to claim 1, wherein said current supplied to said electrical temperature-influencing means for said individual compartments is direct current and said means producing a signal proportional to the total said current supplied comprises a diverter resistance connected in said circuit for supplying said current to said electrical temperature-influencing means.

7. An arrangement according to claim 1, wherein said electrical temperature-influencing means for said individual compartments comprises Peltier units, and said circuit for supplying current to said temperature-influencing means includes a common return wire, said means for producing a signal proportional to the total said current supplied being connected to said return wire.

References Cited by the Examiner
UNITED STATES PATENTS 2,556,065  6/1951  Callender _____ 219—499
3,139,515  6/1964  Leigh et al. _____ 219—202

RICHARD M. WOOD, *Primary Examiner.*